United States Patent
Shishalov et al.

(10) Patent No.: US 10,009,532 B2
(45) Date of Patent: Jun. 26, 2018

(54) DISTRIBUTED ARCHITECTURE OF FOREST VIDEO MONITORING SYSTEM

(71) Applicant: LIMITED LIABILITY COMPANY "DISICON", Nizhny Novgorod (RU)

(72) Inventors: Ivan Sergeevich Shishalov, Nizhnij Novgorod (RU); Andrei Viktorovich Filimonov, s. Kamenki (RU); Oleg Andreevich Gromazin, Nizhnij Novgorod (RU); Sergei Vyacheslavovich Brunov, Balakhna (RU); Iaroslav Sergeevich Solovev, Nizhnij Novgorod (RU); Aleksandr Vladimirovich Romanenko, Nizhnij Novgorod (RU)

(73) Assignee: LIMITED LIABILITY COMPANY "DISICON", Nizhny Novgorod (RU)

( * ) Notice: Subject to any disclaimer, the term of this patent is extended or adjusted under 35 U.S.C. 154(b) by 279 days.

(21) Appl. No.: 14/895,214

(22) PCT Filed: Sep. 11, 2014

(86) PCT No.: PCT/RU2014/000679
§ 371 (c)(1),
(2) Date: Dec. 30, 2015

(87) PCT Pub. No.: WO2015/047136
PCT Pub. Date: Apr. 2, 2015

(65) Prior Publication Data
US 2016/0198079 A1 Jul. 7, 2016

(30) Foreign Application Priority Data
Sep. 25, 2013 (RU) .................. 2013143472

(51) Int. Cl.
*H04N 7/18* (2006.01)
*H04N 5/77* (2006.01)
(Continued)

(52) U.S. Cl.
CPC ....... *H04N 5/23203* (2013.01); *G06K 9/0063* (2013.01); *G06K 9/00771* (2013.01);
(Continued)

(58) Field of Classification Search
None
See application file for complete search history.

(56) References Cited

U.S. PATENT DOCUMENTS

2005/0038814 A1* 2/2005 Iyengar ............ G06F 17/30038
2011/0193965 A1* 8/2011 Kim .................... G08B 17/125
348/159

(Continued)

OTHER PUBLICATIONS

Kolaric et al., "Integrated System for Forest Fire Early Detection and Management," Periodicum Biologorum, vol. 110, No. 2, 205-211, 2008.*

*Primary Examiner* — Hung Dang

(57) ABSTRACT

This invention refers to forest video monitoring. A distributed system for forest video monitoring and a method for fire detection implemented by it have been proposed. The system comprises: multiple video servers, with each video server maintaining at least one video camera; at least one object server; and multiple computer terminals. According to the method, such a video server is used to: receive video data from its video camera; analyze the video data in order to detect signs of fire; when detecting signs of fire, create a potentially hazardous data object related to the possible fire detected, with reference to the video data where signs of fire have been detected; and send the data object created to an object server. By means of any object server: the potentially hazardous data object shall be received; the potentially (Continued)

hazardous data object received shall be compared to potentially hazardous data object previously saved; based on results of comparison, the potentially hazardous data object received shall be saved at least once, at least one potentially hazardous data object previously saved shall be modified, and the potentially hazardous data object received shall be modified; and at least one potentially hazardous data object shall be sent to a computer terminal. By means of a computer terminal: any potentially hazardous data objects shall be received and submitted to the operator. The technical result involves arranging efficient data traffic and ensuring flexible management of computational resources.

17 Claims, 10 Drawing Sheets

(51) Int. Cl.
*H04N 9/80* (2006.01)
*H04N 5/232* (2006.01)
*G08B 17/00* (2006.01)
*G08B 17/12* (2006.01)
*G06K 9/00* (2006.01)
*H04L 29/08* (2006.01)

(52) U.S. Cl.
CPC ......... *G08B 17/005* (2013.01); *G08B 17/125* (2013.01); *H04L 67/10* (2013.01); *H04N 5/23206* (2013.01); *H04N 7/181* (2013.01)

(56) References Cited

U.S. PATENT DOCUMENTS

| | | | |
|---|---|---|---|
| 2013/0217332 A1* | 8/2013 | Altman | H04H 60/90 455/41.2 |
| 2013/0329719 A1* | 12/2013 | Chung | H04W 76/046 370/345 |
| 2015/0077737 A1* | 3/2015 | Belinsky | G01N 15/0211 356/51 |
| 2016/0093212 A1* | 3/2016 | Barfield, Jr. | H04N 7/185 348/144 |
| 2017/0193808 A1* | 7/2017 | Raj | G08B 27/005 |

\* cited by examiner

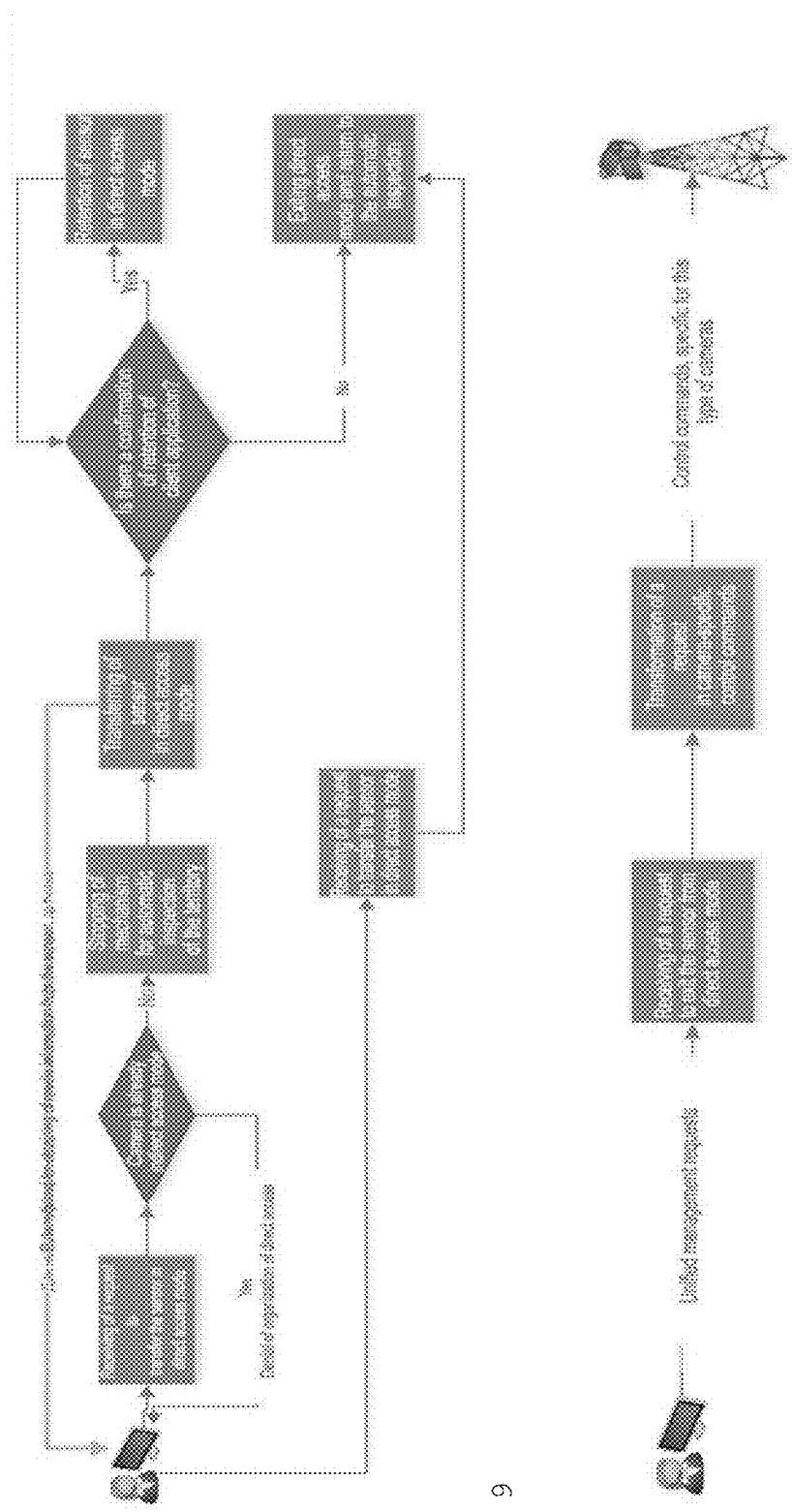

DISTRIBUTED ARCHITECTURE OF FOREST VIDEO MONITORING SYSTEM

TECHNICAL FIELD

This invention generally belongs to the field of video surveillance and, more specifically, to distributed architecture of a forest video monitoring system which, on the whole, provides a possibility to monitor vast wooded terrains and identify coordinates of objects detected using optical passive location for purposes of early detection of forest fires in order to further contain and extinguish them.

BACKGROUND

Forest video monitoring systems intended for detecting and locating forest fires have found their use quite recently. However, they are becoming more and more relevant since a problem with forest fires may arguably be regarded as one of the most serious issues that are currently unresolved by people. Forest fires break out and cause extensive damage in lots of countries all over the world, which may be evidenced by forest fires that broke out within the territory of the Russian Federation in the summer 2010. Those fires had disastrous effects, one of reasons for that being a failure to detect and locate them early, which was repeatedly and explicitly exposed in the media.

The basic structure of the "classical" forest video monitoring system is illustrated below, with reference to FIG. 1. Well-known examples of such forest video monitoring systems include but are not limited to such systems as Forest-Watch (Canada), IPNAS (Croatia), FireWatch (Germany). Similar systems such as Klyon (which means "Maple" in Russian) and "Baltika" (which stands for "Baltic" in Russian) have been developed in the Russian Federation.

Forest video monitoring system 100 illustrated in FIG. 1 generally includes a number of remotely controlled video monitoring points 110 and at least one automated operator workstation 120 connected to them for proper operation of video monitoring points 110.

Equipment 120 of automated operator workstation is generally implemented on the basis of widely known computer and communication technologies and typically includes a computer configured to share data remotely and having dedicated and general-purpose software installed in it. General-purpose hardware and software (such as an operating system) that are a part of such a computer are widely recognized in technology. In this regard, the term "computer" may be applied to a personal computer, a laptop, a set of interconnected computers with features that meet requirements established for computer system 100. A computer is connected to a display device which shows a graphical user interface (GUI) associated with a specialized application. The GUI enables operators to perform their work related to visual surveillance of the territory and management of video monitoring points 110. Interaction with elements of the graphical user interface is carried out with the help of well-known input devices connected to a computer, such as a keyboard, a mouse, etc.

Every video monitoring point 110 is actually a piece of transmission equipment 111 placed on a tall structure 112. Tall structure 112, as a rule, may be any tall structure that meets requirements established for system 100 (i.e. a structure that is fit for placing transmission equipment at a sufficient height and that provides an opportunity to observe quite a vast territory) and is usually a tower put up by a communication provider or a mobile carrier, or a television tower, or a light tower, etc.

A generic term "transmission equipment" 111 is used in relation to equipment placed on tall structure 112. Such equipment includes a controlled video unit 113 and a communication module 114 for communication/data exchange with operator workstation(s) 120.

Controlled video unit 113 normally comprises a digital video camera 115 equipped with a zoom system 116 and mounted on a rotating device 117 which can be used to mechanically change spatial orientation of camera 115 with high precision.

Transmission equipment 111 also includes a video camera control equipment 118 connected to communication module 114, video camera 115, zoom system 116, and rotating device 117 and designed for general control of functions performed by the controlled video unit 113 as a whole and by its components in particular. Thus, upon receipt of control signals from the operator through communication module 114, control unit 118 is designed to set required spatial orientation of video camera 115 (e.g. in order to point it at an object that must be monitored) by controlling rotating device 117 and/or zoom in/out on an image of the object monitored with it by controlling zoom system 116. In addition, control unit 118 is designed to determine the current spatial orientation of camera 115 and provide data on its current spatial orientation through communication module 114 to a requesting party (in particular, to operator workstation 120, where these data shall be displayed in the GUI, for instance). Functionalities listed here are known properties of modern sets of controlled video cameras offered on the market.

Control unit 118 is generally a hardware unit based on microprocessors such as a controller, microcomputer, etc. and obvious to a specialist. It is programmed and/or programmable in a certain manner to perform functions assigned to it. Control unit 118 may be programmed, for instance, by recording (embedding) its firmware, which is widely known in technology. Accordingly, video camera control unit 118 is normally connected to a memory unit (such as an integrated flash memory) which stores corresponding (micro) software that works to fulfill functions associated with control unit 118.

Workstations 120 may be connected to video monitoring points 110 both directly and via a communication network (such as network 130) using widely known and applied wired and/or wireless, digital and/or analog communication technology, while communication module 114 of video monitoring point 110 and computer communication interface of operator workstation 120 must meet communication standards/protocols which such connection is built on.

Thus, an illustrative network 130 which is connected to video monitoring points and automated operator workstations 120 may be an address network, such as the Internet. If there is a data channel belonging to a third-party provider available on the site where video monitoring point 110 is installed, which is frequently encountered, it is preferable to use this channel to connect transmission equipment 111 to the Internet. If it is not possible to connect video monitoring point 110 to the Internet directly on the site where it is installed, widely known wireless broadband technology (such as Wi-Fi, WiMAX, 3G, etc.) shall be used to provide communication between transmission equipment 111 and an Internet access point. Operator workstations 120 are connected to network 130 in a similar way. In particular, depending on the access technology applied, a modem (including a wireless one), a network interface card (NIC), a wireless access card, etc., being whether external or internal in relation to operator computer workstation 120, may be used in order to connect to network 130.

As a rule, system 100 also includes server 140 connected to network 130. Functions of centralized control over a set of video monitoring points 110 and over their interaction with operator workstations 120 are delegated to this server in order to ensure reliable operation of system 100. Server 140 is typically a high-performance computer or a set of interconnected computers (such as a rack of blade servers) with specialized server software installed on it (them) which has (have) high-speed (e.g. optical) connection to the Internet. Hardware/software implementation of such a server is obvious to an expert. In addition to general functions related to controlling system 100, server 140 can perform various highly specialized functions—for example, it can function as a video server which ensures collection and intermediate processing of data and provision of such data upon user's request.

With a forest video monitoring system arranged in this manner, one user can monitor the territory controlled, while managing multiple cameras at the same time. Besides, due to the above-described typical functionalities it is possible to automatically locate a fire source rapidly when monitoring with multiple video cameras by using a widely known angle-measuring method and store predetermined patrol routes in a memory (for instance, on server 140 or in a computer of operator's workstation 120) in order to access them promptly and carry out monitoring procedures. In this context, a "patrol route" implies a predetermined sequence of camera orientation changes meant for providing visual information related to a predetermined territory required.

It should be noted that capacity of modern electronic hardware enables you to use it as a basis for creating devices meant for visualization and control out of components that are part of the forest video monitoring system having fairly broad user functionality, which greatly simplifies operator's work. In addition, modern hardware, with the aid of software specially executed by it, can take over some functions related to automatic detection of potentially hazardous objects on videos or still images obtained from video cameras (in terms of forest monitoring, such objects may include but are not limited to smoke, fire, etc.). These computer vision systems designed for searching an image for hazardous objects can use prior information about features of smoke or fire such as specific movement, color, brightness, etc. Such computer vision systems are applied in a number of industries, ranging from robotics to security systems, which is quite thoroughly described in, e.g., publication *Computer vision. A modern approach* written by D. Forsyth and J. Ponce, Williams Publishing House, 2004, 928 pages.

Such an intelligent subsystem that implements the specified computer vision technology in general can also be implemented both at operator workstation 120 and at server 140, and even in controlled video unit 113.

The abovementioned information is a summarized structural description of the classical system for video monitoring of forests whose principle of operation is based on the use of controlled cameras. Its additional aspects directly related to identifying and processing coordinates of objects detected are reflected in more detail, in particular, in patent publications RU 2458407, WO 2012/118403.

It should be noted that creation and deployment of such forest video monitoring systems has become possible only in recent years. Only present days have seen the number of cell phone towers sufficient for covering main fire hazardous spots. In addition, broadband Internet access which enables us to share large volumes of information and transmit real-time videos via the Internet has become far more available and the cost of equipment ensuring wireless communication over long distances has been reduced.

However, with reference to the most urgent goal of monitoring vast areas (i.e. areas the size of a federal subject or the size of the country) when constructing a forest video monitoring system, the following significant problems should be considered.

A large number of PTZ-cameras required as a part of the system makes it difficult to monitor any area: for example, an operator may miss a section observed by a camera and it may take a while for the next inspection of the site to occur. Therefore, automation systems and automatic detection systems should be used, with such automation of the detection procedure requiring considerable computational resources and transmission of large amounts of data.

However, mere expansion of computational capacities within this framework is not a cure-all solution as there appears an exceptionally challenging task to ensure appropriate communication infrastructure for transmitting data from video monitoring points (such as video monitoring points 110 in FIG. 1) to computers at operator workstations (120) and/or the server (140) due to the fact that considerable spatial distribution and strong heterogeneity is, in fact, inherently typical of such required communication infrastructure.

So, for the time being, technical feasibility to connect video monitoring points to data networks is, as a rule, quite limited. In particular, in order to have a Full HD standard video stream broadcast from a video camera, it is implied by default that there is a communication channel available having a bandwidth of about 4 Mbit/s, however, in some points on the way from the camera to the operator only communication channels with a bandwidth of about 100 kbit/s are provided, which means by default that it is impossible to arrange direct video surveillance.

When looking at the problems outlined above, which arise when solving a problem of monitoring vast territories, it becomes evident that classical systems for forest video monitoring described above are poorly fit for that.

For instance, due to the fact that classical systems for forest video monitoring are "locally" focused, principles of their construction do not imply sufficient flexibility and suggest that there is only one server available where all data processing procedures are carried out. This approach, in its turn, suggests that there must be such a communication infrastructure whose features shall be sufficient for transporting data from cameras, analyzing them, and delivering analysis results to end consumers. As mentioned above, experience of building systems for monitoring vast areas shows that any communication infrastructure, considerably spread geographically, always has bottlenecks (i.e. areas with insufficient throughput capacity) which reduce general efficiency of data delivery. That fact alone makes the use of classical schemes of building video monitoring systems both technically and economically unfeasible for vast areas due to the fact that in order to eliminate such bottlenecks it is required to arrange new high-speed communication channels on a large scale, including deployment of new equipment, etc. and/or costly rental of existing high-speed communication channels provided by third parties.

In addition, with implicitly intense automated processing of video data, it is also problematic to concentrate such processing procedures on one server due to limitations of computational resources of a single server.

In order to illustrate the foregoing, FIG. 2 shows an approximate need for various components of classical system 100 for forest video monitoring according to FIG. 1 in terms of communication channels where the arrow width nominally meets a required throughput capacity of an input/output communication channel (not to scale). In this case, the term "Internet" implies a digital data transmission network which has virtually no speed limits.

Thus, technology is in need of building a distributed architecture for a forest video monitoring system within a large area which would ensure efficient arrangement of data traffic, eliminating the need for widespread use of expensive high-speed channels within any controlled large area, and provide flexible management of computational resources required for analyzing the data obtained.

SUMMARY

The goal of this invention is to create a distributed system for forest video monitoring with data traffic efficiently arranged and flexible management of computational resources provided as well as to develop a method for automated fire detection carried out by the system.

According to an aspect relevant to this goal, a system for forest video monitoring has been proposed. The proposed system is comprised of multiple video monitoring points, with each such a point containing a video camera installed on a tall structure.

This forest video monitoring system also contains a subsystem comprising at least one video server and used for video monitoring management and primary processing of video data. At least one video monitoring point out of those multiple ones is assigned to every video server so that the video server could control video cameras of the single or multiple video monitoring point(s). Each server is connected to the video cameras of the video monitoring points assigned to it via a communication channel for receipt of video data recorded with these cameras. For instance, the video servers and the video cameras of the video monitoring points assigned to them can be connected to a high-speed virtual private network (VPN).

In addition, the proposed system comprises: a subsystem for data storage and secondary data processing which contains at least one object server; and at least one computer terminal. These video servers, object servers, and computer terminals are connected to a communication network.

Each video server is configured to: analyze captured video data for signs of catching fire; having detected signs of fire, create a potentially hazardous data object related to detected possible fire; and send this potentially hazardous data object to the subsystem for data storage and secondary data processing, preferably, with enquiry to save this potentially hazardous data object in the subsystem for video data storage and secondary video data processing.

Each object server is configured to: save and modify potentially hazardous data objects as well as send potentially hazardous data objects to computer terminals. It is preferable that the object server will receive potentially hazardous data objects from the subsystem for video monitoring management and primary processing of video data.

Each terminal computer has a client application to ensure interactions between an operator and the subsystem for video monitoring management and primary processing of video data as well as the subsystem for video data storage and secondary video data processing. This client application is configured to receive potentially hazardous data objects from the subsystem for data storage and secondary data processing and submit them to the operator.

According to the type of embodiment, the subsystem for video monitoring management and primary processing of video data also contains at least one database, with each video server configured to store video data obtained with reference to associated descriptive metadata in the database related to this server from the single or multiple database(s).

According to the type of embodiment, each video server includes a computer-implemented computer vision system for analyzing video data as stated above. Video server's computer vision system retrieves video data for analysis from the data base associated with it. Video server's computer vision system is configured to create a potentially hazardous data object upon detecting signs of fire in the video data analyzed so that the potentially hazardous data object created would be linked to the video data where signs of fire have been detected as well as to the associated metadata that describe features of video data recording. It is preferable that a computer-implemented computer vision system shall be configured to use different algorithms of computer vision to ensure that signs of fire are detected by different types of cameras and under different filming conditions.

According to the type of embodiment, each object server is also configured to: compare any potentially hazardous data object received with potentially hazardous data objects previously saved in order to find potentially hazardous data objects that are interrelated with the potentially hazardous data object received. Based on results of comparing, the object server is configured to save the potentially hazardous data object received at least once, modify at least one of the potentially hazardous data object previously saved, and modify the potentially hazardous data object received. When detecting a potentially hazardous data object basically coinciding with the potentially hazardous data object received and stored among potentially hazardous data objects previously saved, the object server is configured to, preferably, adjust features of the potentially hazardous data object detected on the basis of features of the potentially hazardous data object received, without saving the potentially hazardous data object received.

According to the type of embodiment, each object server is configured to save and maintain all changes of potentially hazardous data objects available in it, even after deleting potentially hazardous data objects.

According to the type of embodiment, the subsystem for video monitoring management and primary processing of video data also includes a video server control unit connected to a communication network for managing operation of video servers. A video server controller is configured to dynamically reallocate load between video servers. A video server controller preferably contains tools for diagnosing and analyzing both current and average load produced upon video servers, with such load including computational load and network traffic load. Video servers receive lists of video monitoring points assigned to them to be maintained by a video server controller. A video server controller is preferably configured to automatically reassign video monitoring points between video servers depending on the load produced upon video servers, whereas each video server is preferably configured to monitor its list of video monitoring points in terms of changes applied to it by a video server controller.

According to the type of embodiment, the proposed forest video monitoring system also contains a single or multiple server(s) within user environment for controlling and configuring access of operators to components and resources of the forest video monitoring system via client applications as well as for routing, alongside client applications, of data required by operators for their work. Together with servers within user environment, each client application is configured to dynamically determine and visualize information about components and resources available for operators in the forest video monitoring system. The client application in this case is configured to visualize the list of object servers available for operators, a list of video servers available for operators, and a list of available cameras maintained by these video servers. The client application is configured to provide any operator with a possibility to access video data fed in real time from any camera accessed by him/her, or to video data saved that have been recorded by any available camera before as well as manage operation of any video camera available.

According to the type of embodiment, each client application is configured to perform the following functions: visualize a list of potentially hazardous data objects obtained from object servers; when any potentially hazardous data object from the list of potentially hazardous data objects is handled by any operator, the application shall request video data stored in the database and related to this potentially hazardous data object as well as associated metadata from the corresponding video server; visualize the mentioned potentially hazardous data object for the operator by visualizing the video data received and metadata associated; and enable the operator to confirm or not to confirm the fire possibly caught which is indicated by the potentially hazardous data object visualized.

According to the type of embodiment, the client application is configured to assign video monitoring points and/or assign a spatial area of responsibility to each object server.

In accordance with the method of fire detection via one video server out of multiple video servers which is implemented by the forest video monitoring system proposed: video data are received from at least one camera; video data are analyzed in order to detect signs of catching fire; having detected signs of fire, it is required to form a potentially hazardous data object related to detected possible fire, with reference to video data which showed signs of fire caught and, preferably, with a further reference to metadata that describe features of video data recording; and send this potentially hazardous data object to at least one of the object servers.

Any object server is used for: receiving a potentially hazardous data object; comparing the potentially hazardous data object received with potentially hazardous data objects previously saved; using the results of comparing for saving the potentially hazardous data object received at least once, modifying at least one of the potentially hazardous data object previously saved, and modifying the potentially hazardous data object received; and sending one or several potentially hazardous data objects to at least one computer terminal.

Any computer terminal is used for: receiving potentially hazardous data objects and submitting them to an operator.

According to the type of embodiment, when, based on the results of comparison mentioned above, detecting a potentially hazardous data object basically coinciding with the potentially hazardous data object received and stored among potentially hazardous data objects previously saved, the potentially hazardous data object detected shall be modified on the basis of the potentially hazardous data object received, without saving the potentially hazardous data object received.

According to the type of embodiment, the method proposed also contains such stages where a computer terminal is used to do as follows: visualize a list of potentially hazardous data objects obtained from object servers for its operator; when any potentially hazardous data object from the list of potentially hazardous data objects is handled by its operator, video data related to this potentially hazardous data object and associated metadata from the corresponding video server shall be requested; visualize the potentially hazardous data object mentioned for the operator by visualizing the video data received and metadata associated; and enable the operator to confirm or not to confirm the fire possibly caught which is indicated by the potentially hazardous data object visualized.

BRIEF DESCRIPTION OF THE DRAWINGS

The foregoing and other aspects and advantages of this invention are set forth in its detailed description given below, with references to the drawing figures, where:

FIGS. 9 and 10—illustration of working with a video camera directly from a client application;

FIG. 11—illustration of camera control via a video server;

DETAILED DESCRIPTION

According to this invention, the distributed architecture for a forest video monitoring system proposed shall include the following basic components:
  distributed video monitoring points;
  a subsystem for video monitoring management and primary processing of video data;
  a subsystem for data storage and secondary processing of data;
  operator computer terminals.

Figure 1:
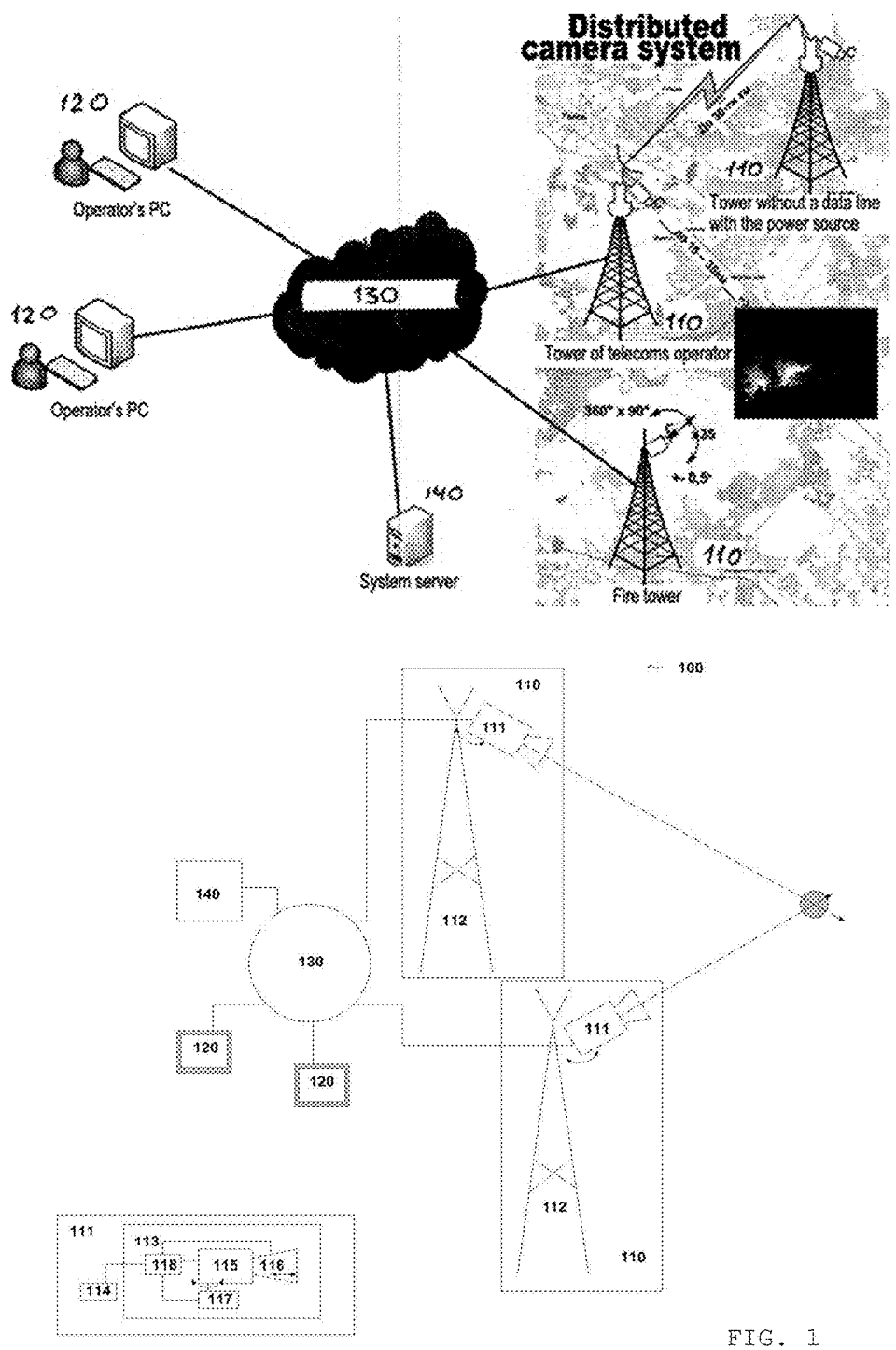
FIG. 1—schematic partial illustration of a forest video monitoring system.
Figure 2:
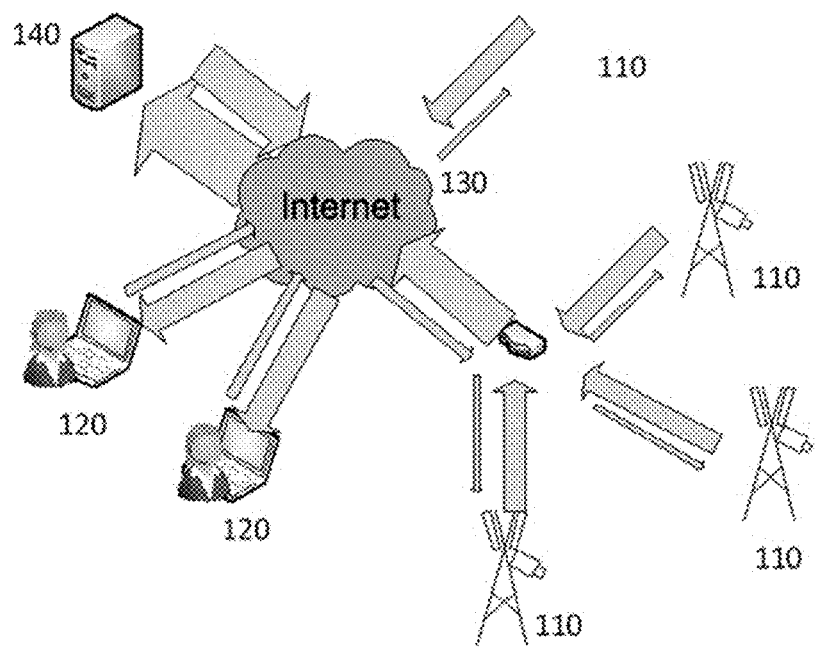
FIG. 2—illustration of components required for system 100 according to FIG. 1 in communication channels.

Aspects of the architecture proposed, in terms of video monitoring points, with each such point containing a network video camera on a tall structure, are similar to corresponding aspects of the classical forest video monitoring system 100 described above with reference to FIG. 1.

Also, low-level aspects of computer terminals comprising the system proposed are similar to corresponding computerized operator workstations 120 of system 100, with a client application installed on each terminal computer, as has been said above, which enables its operator interact with the subsystem for video monitoring management and primary processing of video data as well as with the subsystem for data storage and secondary processing of data.

Figure 3:
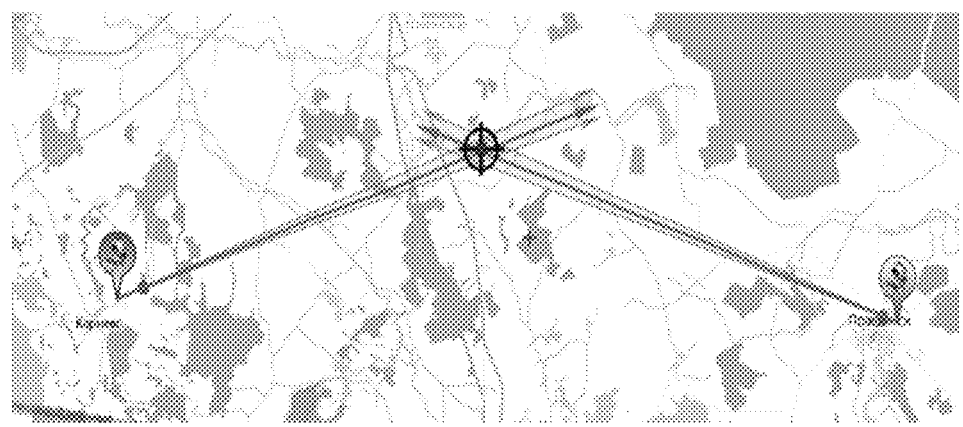
FIG. 3—general illustration of the forest video monitoring system according to the present invention.

A preferred embodiment of a distributed system 300 for forest video monitoring in accordance with this invention shall be described below, with reference to FIG. 3.

Subsystem 320 for video monitoring management and primary processing of video data contains one or several video servers 3210, all of which are collectively regarded as a video server farm.

One or several video monitoring point(s) 310 is (are) assigned to each video server 3210 so that they would control their video cameras and receive video data recorded by them. In this case "control" implies including but not limited to such assignment aspects typical of the classical forest video monitoring system described above as a video camera patrol route, spatial orientation, and zoom (for example, for pointing a camera at a particular object afield), calibration, etc.

As it is implied that large amounts of data shall be received from video cameras, including cases when they are received in real-time, video servers 3210 shall be geographically placed in such a way that they are connected to corresponding video monitoring points 310 via communication channels having sufficient throughput capacity (e.g. having a bandwidth of at least 4 Mbit/s, as stated above). Figuratively speaking, video servers 3210 shall be located in the immediate "logical proximity" from their relevant video monitoring points 310. For instance, video server 3210 may be expertly connected to video monitoring points assigned to it via a high-speed virtual private network (VPN) where speed between a video server and an array of cameras is at least 30 Mbit/s. At the same time, video server 3210 can be configured to set such parameters as frame rate per second, parameters of video flow compression, the type of information taken from a camera, etc., in order to ensure a required bandwidth of communication channels with video cameras.

Every video server 3210 shall receive video data recorded with video cameras maintained by it.

Subsystem 320 for video monitoring management and primary processing of video data may also include one or several databases 3220 so that video servers 3210 might save data in and retrieve data from them. In this case, the term "database" refers to physical storage of high-capacity information and data stored in it and accordingly arranged. Although databases 3220 in FIG. 3 are shown separately in relation to video servers 3210, it must be obvious for an expert that at least some databases 3220 may be integrated with their respective video servers 3210 (e.g. data from any database may be stored in a data storage device(s) that is (are) a part of the server).

Every video server 3210 preferably retains video data broadcast with video cameras in a database(s) 3220 related to it.

According to the type of embodiment preferred, when passing a route or a system of routes, video server 3210 shall send an instruction to a video camera saying that the camera must be positioned at a set point for filming or repositioned to a new point for filming. While doing this, video server 3210 shall set such parameters for filming as camera identifier, target azimuth angle, angle of declination, lens opening, shooting time, etc. Having achieved the desired position, a video camera shall start recording and send recorded video data to video server 3210.

Then, video data recorded shall be saved by video server 3210 in database 3220 together with set shooting parameters which constitute metadata associated with these video materials, using formats and/or data compression techniques that are well known in technology. Parameters listed above as well as other possible parameters that are part of descriptive metadata may be logically arranged in any suitable manner known, in particular, in the field of programming (e.g. into data structures).

According to the type of embodiment preferred, video data shall be saved as follows. Video server 3210 shall normally create a static image out of video data recorded and complete the database with records of a predetermined number of still-frame images made from the video flow and constituting a video clip together with two static images (full-size and thumbnail), formed out of the captured still image. Static images can be saved in the database with the help of any well-known format such as JPEG, TIF, PNG, etc., whereas a video can be respectively saved in the database using, for instance, such widely known format as MPEG, with video duration (number of frames) preconfigured or dynamically selected by the video server.

In accordance with the present invention, each video server 3210 is configured to analyze video data recorded in order to detect signs of fire.

According to the type of preferred embodiment of the present invention, this analysis shall be carried out by a computer vision system implemented as a part of video server 3210, in respect of video data retrieved from the database 3220. According to the foregoing, the use and possible hardware and software implementation of computer vision systems are widely known in various fields of technology. This analysis can be carried out on demand, it can be continuous or scheduled, or otherwise performed.

Required video data and metadata may be retrieved from the database by following the link which comprises unique camera identifiers as well as a patrol route and/or a specific filmed fact within the route, which unambiguously identify video materials recorded with the camera. Such a set of identifiers constituting a link shall clearly define every filmed fact with every video camera within the system and enable you to obtain both relevant video content and associated metadata that describe it.

A computer-implemented computer vision system shall analyze the retrieved content with regard to signs of catching fire, i.e. detection of potentially hazardous objects (PHO) such as smoke, fire, etc. in multimedia content, in accordance with the foregoing summary, and their geographical location. According to this invention, upon detecting signs of fire, a computer vision system of a video server is configured to form a special potentially hazardous data object, characterizing a PHO detected. It should be understood that the PHO detected by the computer vision system in its video data does not have to correspond to the actual fire caught but may also be caused by false response of the computer vision system.

It should be noted that the computer vision system may use different computer vision algorithms in order to ensure that signs of fire are detected by different types of video cameras and under different conditions of filming.

According to the type of embodiment preferred, a potentially hazardous data object formed may include: its name that is created for an automatically found PHO based on the name of a video camera it has been found with and the time at the moment of detection; evaluation of PHO coordinates; evaluation of the area where this PHO may be located; the degree of certainty for the PHO found by the computer vision system (for instance, PHO signs detected repeatedly when inspecting the area shall increase the degree of certainty); its status (unconfirmed by man, confirmed by man), etc.

Parameters listed above as well as other possible parameters may be logically arranged in any suitable manner known, in particular, in the field of programming (e.g. they may be structured or classified).

Retrieved metadata shall also be used in computing performed by the computer vision system. In particular, when recording a PHO by a camera, a computer vision algorithm shall produce its coordinates in pixels. Moreover, in order to restore this PHO alleged location you need to know where and how the video camera had been "watching" when recording the material which constitutes the analyzed content.

According to the present invention, a potentially hazardous data object is created with reference to video data where a relevant PHO has been detected. As mentioned above, based on results of filming, the video server 3210 shall save multimedia data together with their relevant metadata in database 3220, which in this case means that multimedia data shall preferably include a video and two static images (full-size and thumbnail), where a PHO detected is shown. For this end, a relevant potentially hazardous data object is supplemented with a link to multimedia data related to it and its associated metadata which may be retrieved from the database by following this link. A possibility to implement such a link has been described above.

Although a preferred approach based on a computer vision system has been described above, it should be understood that potentially hazardous data objects can be detected otherwise, for example, manually by an operator while watching video materials. In this case, a relevant potentially hazardous data object can be properly formed upon operator's request with the help of the client application installed on this operator's terminal and providing relevant functionalities.

Video servers 3210 are connected to a global communication network 360 such as the Internet. A potentially hazardous data object created shall be sent by the video server via communication network 360 to subsystem 330 for video data storage and secondary processing of video data, preferably, with a request to save it in subsystem 330 for video data storage and secondary processing of video data.

Subsystem 330 for video data storage and secondary processing of video data includes at least one object server 3310 connected to network 360 and enabling communication with video servers 3210.

Each object server 3310 is configured to save and modify potentially hazardous data objects received.

According to the type of embodiment preferred, object server 3310 has a data storage device(s) where potentially hazardous data objects are saved, and object server 3310 shall compare a potentially hazardous data object received with potentially hazardous data objects previously saved. A potentially hazardous data object can be obtained by server 3310 from subsystem 320 for video monitoring management and primary processing of video data, in the manner described above, or from another component of forest video monitoring system 300 such as operator's terminal 340 using a manual method described above. It should be noted that operation of object server 3310 does not depend on the type of a source used by it for receiving a potentially hazardous data object.

With a receipt procedure indicated, object server 3310 can adjust both a potentially hazardous data object recently submitted and existing potentially hazardous data objects if there is an interconnection detected between the potentially hazardous data object recently submitted and the existing one(s).

In particular, when among potentially hazardous data objects previously saved there is a data object detected which corresponds to (for example, coincides with) the potentially hazardous data object received, object server 3310 shall adjust characteristics of this data object detected based on characteristics of the data object received. If there are no data objects corresponding to this potentially hazardous data object received among potentially hazardous data objects previously saved, object server 3310 shall save the data object received in its memory as a new potentially hazardous data object.

Figure 4:
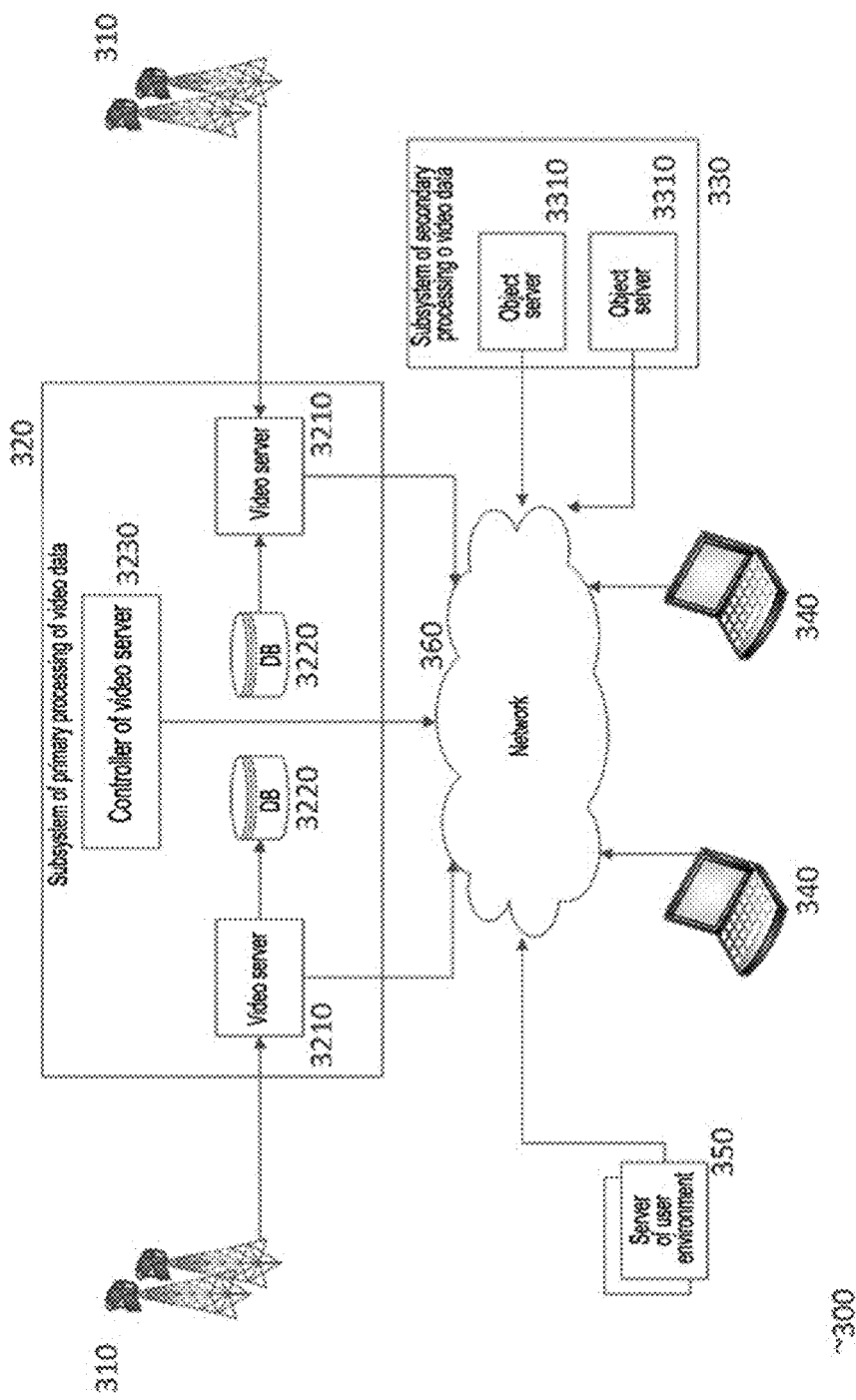
FIG. 4—illustration of one potentially hazardous data object being detected with two video cameras.

Operation of object server 3310 described above shall be further illustrated by an example of detecting one PHO with two video cameras controlled by different video servers, which is described with reference to FIG. 4.

While analyzing the video flow, each of the two video servers shall decide on finding signs of a potentially hazardous object in a frame and create a corresponding potentially hazardous data object. Further, each of them shall report about discovering a PHO to its object server by sending a created potentially hazardous data object to it. The object server shall save the first potentially hazardous data object received and based on the second potentially hazardous data object received it shall decide to clarify characteristics of the first data object saved instead of saving the second potentially hazardous data object. At the same time, with specified clarification of characteristics, at least some parameters set forth above and constituting such a potentially hazardous data object can be adjusted.

In addition to the fact that an object server does not save, as a matter of fact, duplicated data objects, the example given above provides further benefits ensured by specified parameters of potentially hazardous data objects. The benefits are as follows:
  reduced likelihood that PHOs detected are false response of a computer vision system;
  enhanced precision in computing location of a potential fire;
  enhanced precision in computing coordinates for the central point of fire, e.g. by performing a triangulation based on the known coordinates from two cameras which have recorded the fact of catching fire, and two direction vectors of this fire.

Note that each object server 3310 can be configured to support and maintain a history of all changes to potentially hazardous data objects that it controls, even after removal of objects (for example, by an operator).

Each object server 3310 shall send potentially hazardous data objects saved to operator computer terminals 340 connected to the global communication network 360, which can be done on demand or automatically. A client application installed in each operator terminal 340 is configured to receive potentially hazardous data objects from subsystem 330 for data storage and secondary processing of data and submit potentially hazardous data objects to its operator, preferably, by visualizing them on the GUI display associated with the client application.

According to the preferred embodiment of the invention, the client application is configured to visualize an interactive GUI list of potentially hazardous data objects received from available object servers and show it to its operator in the corresponding area of its GUI. The operator can select any potentially hazardous data object on his/her list, using any existing input device such as a mouse. When the operator activates an element from the interactive list associated with the potentially hazardous data object selected, the client application shall send a request for multimedia data associated with this data object as well as associated metadata via network 360 to a relevant video server.

As stated above, any potentially hazardous data object includes a link to recorded video data associated with it and relevant metadata. As a result, this link is used by the video server to retrieve requested multimedia data (e.g. a video and a photo of a PHO) from the database, along with descriptive metadata, and using network 360 to transfer them to the terminal where the user in the GUI of their client application may watch them. For example, when the user resorts to this method to watch archived video data, the GUI will also provide him/her with metadata saying, in particular, where and when the camera was "looking" while recording. Besides, when presenting an interactive list of potentially hazardous data objects, thumbnail images related to them may be presented in the GUI, correspondingly.

Based on inspection findings, the client application also enables the operator to confirm or not to confirm possible fire, which is indicated by visualizing such a potentially hazardous data object. This functionality may be plainly implemented in the GUI. At the same time, the above mentioned status, being a part of a potentially hazardous data object, which by default was set to "not confirmed by man" when created may be changed to "confirmed by man".

In addition, the client application GUI may be easily configured to have such a function as deleting any potentially hazardous data object(s) presented in its interactive list (for example, if the operator established that this potentially hazardous data object corresponds to false response by the computer vision system).

According to the type of embodiment preferred, the proposed forest video monitoring system 300 includes at least one user environment server 350 connected to communication network 360. Environment servers 350 enable users to log in and store data associated with users and required by the system for adjusting user environment correctly when they work. In other words, environment servers ensure control and configuration of access by operators to components and resources of forest video monitoring system 300 via client applications installed or via their computers 340. In conjunction with client applications, they also provide routing of data required by operators for doing their job.

Possible implementations of such a user environment service are widely known in technology (e.g. Active Directory from Microsoft Corporation).

Naturally, proper interactions between operators and components of system 300 may be arranged in a known manner even without the use of user environment servers 350. However, it is preferred that servers are available for optimal organization of operators' remote work within the system.

Further, according to one more preferred embodiment of the present invention, subsystem 320 for video monitoring management and primary processing of video data also contains video server controller 3230 connected to communication network 360 to control operation of video server farm 3210. Video server controller 3230 is configured to dynamically reallocate load between video servers belonging to the server farm.

According to the type of embodiment preferred, video server 3210 receives a list of video monitoring points 310 assigned to it for maintenance from video server controller 3230. Video server controller 3230 is configured to be able to dynamically reassign video monitoring points to video servers, depending on the computational load produced upon video servers and data traffic distribution. Video server 3210 continuously monitors its list of video monitoring points in terms of any changes introduced into it by video server controller 3230.

Thus, when started, video server 3210 determines a list of video monitoring points (video cameras) which it is responsible for and starts continuous monitoring of this list in case it changes in the course of further operation. At the same time, if the list of video cameras controlled by the server changes in the course of video server operation, new control flows will arise for managing video cameras which entered the boundaries of responsibility of this video server, or existing flows are destroyed if some cameras have gone out of video server's scope of responsibility.

Continuous monitoring of the list enables system administrators to promptly transfer processing of cameras from one video server to another one, thereby balancing the load produced upon communication channels and computational resources and, if necessary, the video server that failed shall be replaced by partially using available free capacities of several active video servers. This, in particular, with available free resources of video servers, allows you to reduce downtime for cameras caused by a processing video server going out of order to several dozens of seconds.

In order to automatically (re)balance load between video servers, system 300 may be provided with tools for diagnosing and analyzing the current and average load produced on video servers. Such diagnostic tools are widely known in technology and may be implemented in the form of software, for example, in video server controller 3230.

On operator's part, in forest video monitoring system 300 there is a variety of functionalities available for system management, configuration, and operation which are provided via a client application on any computer 340. In this case, a "client application" does not necessarily refer to the same client application that is used by the operator to work with potentially hazardous data objects according to the summary given above—it may be a separate application that is available in the system only to users with administrator rights.

According to the type of embodiment preferred, a client application with such administrative powers may be configured to (re)assign video cameras to video servers for maintenance, set multiple object servers and (re)assign the scope of responsibility of every object server, (re)assign a list of object servers and a list of video servers available to each operator, etc. Relevant configuration settings may be stored on environment servers 350, including but not limited to the form of user profiles downloaded from environment server 350 to operator computer 340 as they enter the system or start computer 340. The client application on operator terminal 340, is, respectively, configured to use the GUI in order to visualize a list of object servers available to operators, a list of video servers available to operators, and a list of available video cameras maintained by these video servers. Such visualization can be carried out in conjunction with user environment service.

Any client application may define services and system components it must interact with in order to perform user tasks either when this application is started or its operator logically logs in (for example, from profile environment downloaded from the server) or on a continuous basis in the course of its work so that the user app can have (an) updated list(s) at any time.

According to the type of embodiment preferred, a forest video monitoring system may be structurally arranged on a regional basis. For instance, object server(s) maintaining each region, video cameras, and objects (such as towers, etc.) are assigned to each region, operators monitoring it are determined, and a group of video servers is, directly or indirectly, assigned depending on the region cameras belong to. As a result, users can gain access to system resources that belong to respective regions only.

The client application may also be configured to enable the operator directly access video data incoming in real time from any video camera available to him/her or saved video data that have been previously recorded with any video camera available in order to view them as well as enable the operator to control any video camera available, with such functionalities being generally typical of classical video surveillance systems. This aspect shall be discussed further in more details.

Figure 5:
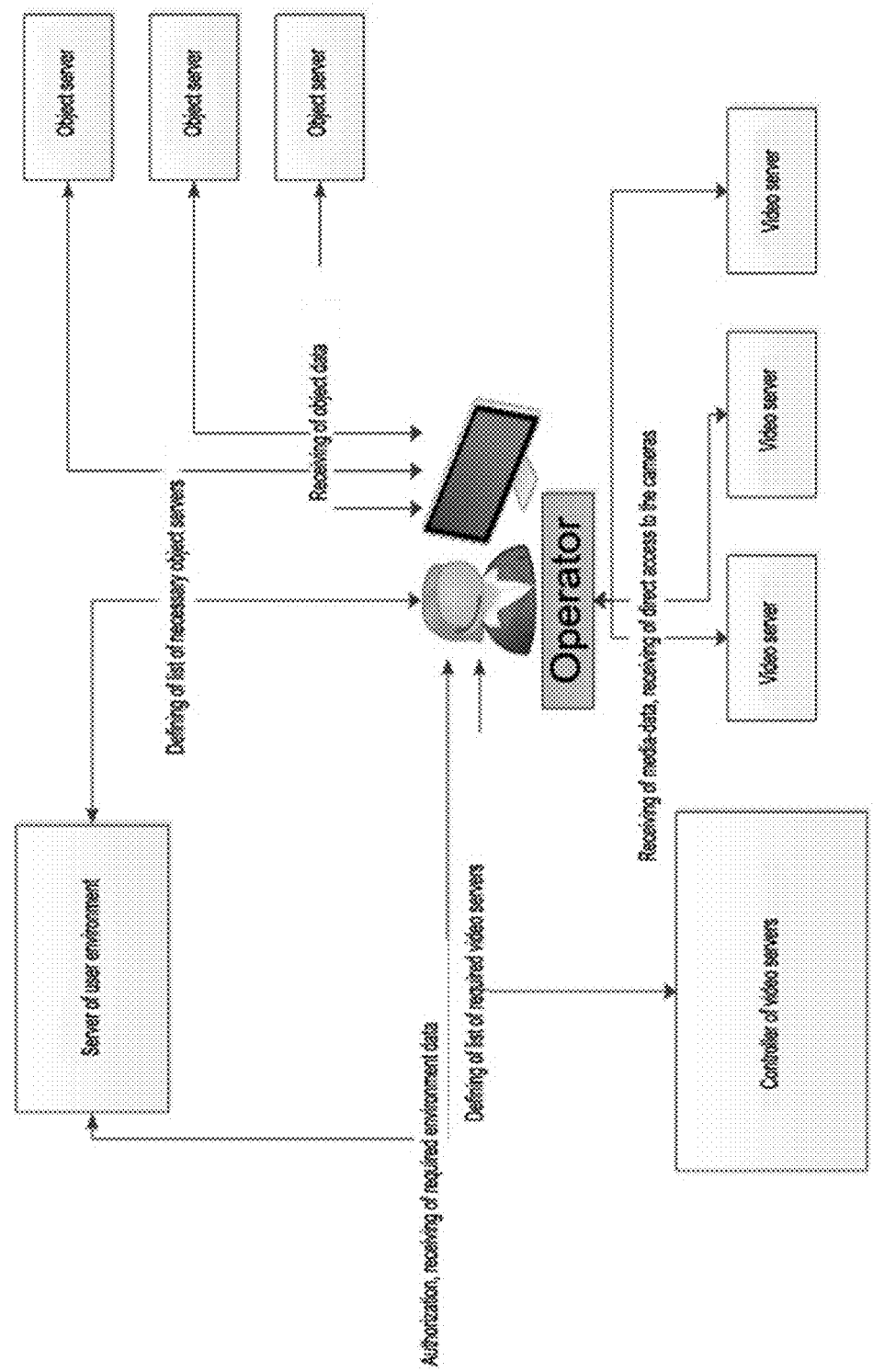
FIG. 5—illustration of the general scheme of interaction between the client application and system 300 components according to FIG. 3.

A general scheme of interactions between a client application and components of system 300, in terms of data received by this client application, is shown in FIG. 5.

It must be evident to any expert that the number, exact geographical location, and operational features of video monitoring points 310, video servers 3210, databases 3220, controller 3230, object servers 3310, environment servers 350, operator terminals 340 is generally determined by technical and economic requirements established for the forest video monitoring system deployed. Low-level aspects of all servers within any system 300 are actually similar to low-level aspects of server 140 within the classical forest video monitoring system 100. Servers indicated shall be configured to perform their functions within the scope of this invention which have been described above by installing such specialized software on them that after its implementation is assigned to a respective server for performing relevant functions. It can be either self-developed software where commercially and publicly available programming environments, libraries, API, and packages are used or custom software, or a combination thereof. Communication networks and data/signals exchange via them can be implemented on the basis of any suitable network solutions and technologies.

Figure 6:
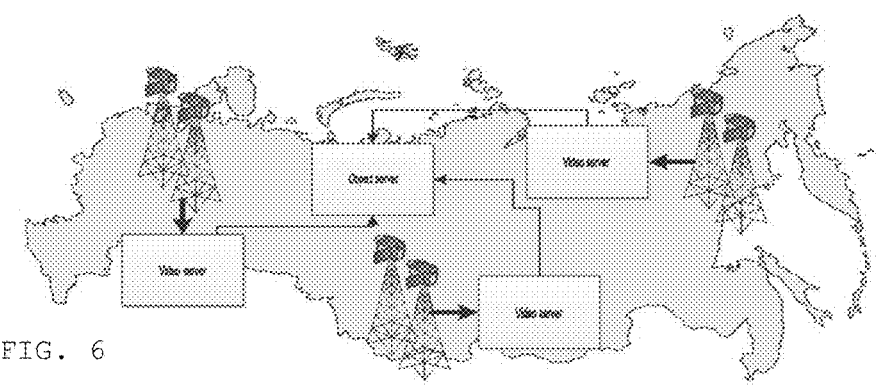
FIG. 6—illustration of the territorial structure of system 300 according to FIG. 3.

Further, by way of explanation, FIG. 6 shows an example of locating the proposed system geographically. The figure shows three groups of video cameras that are geographically distant from each other. It is evident that if a video server was located somewhere in one place, as in the case with the classical system for forest video monitoring, communication infrastructure would have to ensure transportation of video data from all video cameras to this server. In fact, it would mean a necessity to have high-bandwidth channels all across the country, which is de facto difficult to implement. Therefore, the proposed system for forest video monitoring has video servers deployed in the immediate logical proximity to video monitoring points and connected to them via local high-bandwidth channels. At the same time, video servers are connected to the rest of the system (i.e. to global network 360) via channels having lower throughput capacity as, in accordance with the foregoing, the information flow generated by the video server is slightly smaller in volume than the flow from video cameras due to the applied video content filtration. Thus, to ensure comfortable operation of the system, a channel having a bandwidth of 3 Mbit/s would be sufficient for connecting any video server 3210 to any network 360, whereas, according to the foregoing, a VPN locally connecting a video server 3210 to video monitoring points 310 maintained by it provides a throughput capacity of at least 30 Mbit/s. Due to data processing arranged within the system so that it meets this invention, its proper operation shall be ensured even with the outer channel from the video server having a width of 512 kbit/s.

The possibility of territorial and logical distribution of video—and object—servers in compliance with the present invention shall not only provide flexibility related to planning how to deploy the system with the existing communication infrastructure in mind, but also allow you to minimize operational expenses related to maintenance of servers as it allows to deploy services on platforms where the ratio of price/reliability/capacity of the infrastructure is optimal.

Figure 7:
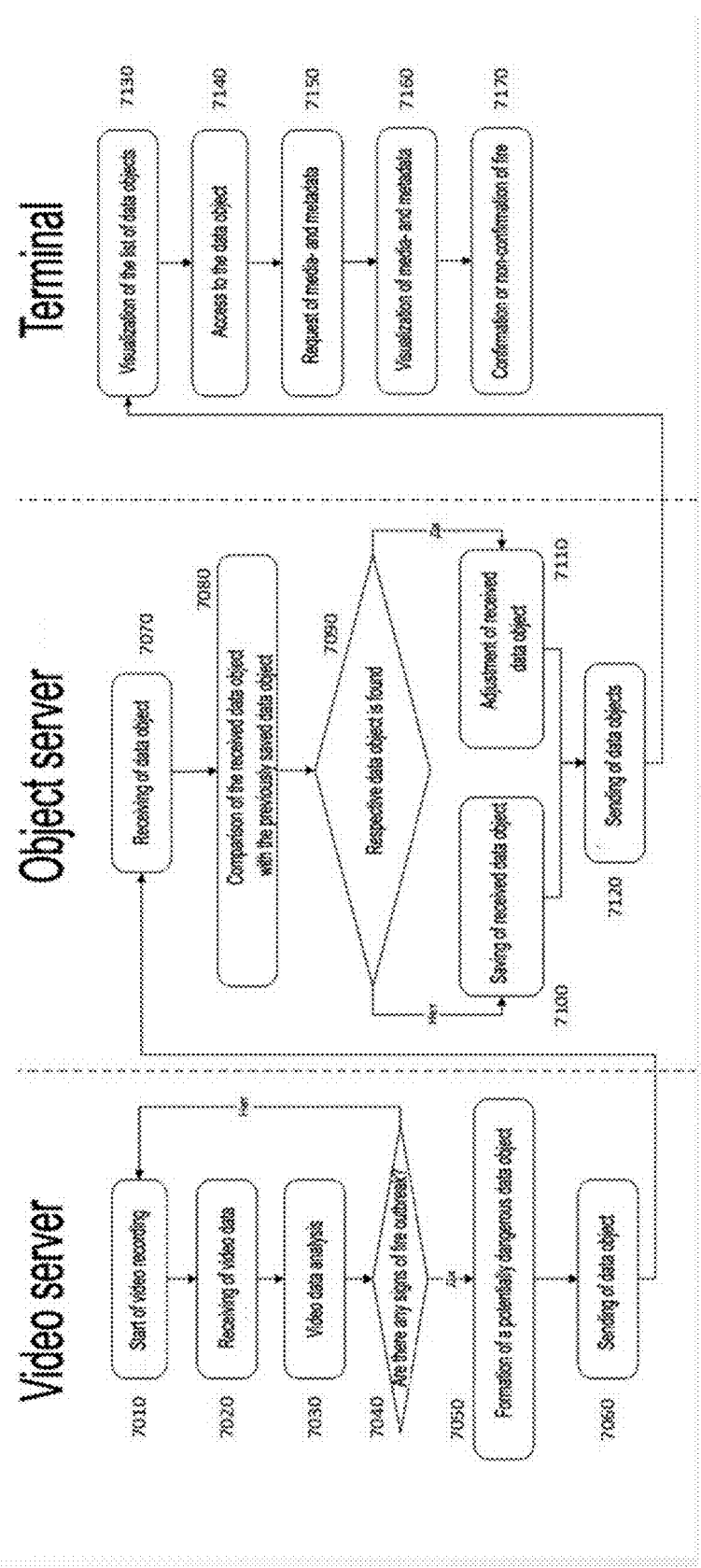
FIG. 7—a logical flowchart of a method for detecting fire caught, according to a preferred type of embodiment of the present invention.

A preferred embodiment that complies with this invention's method for automated fire detection 7000 implemented within forest video monitoring system 300 shall be described further, with reference to FIG. 7.

At stage 7010, a video-monitoring-point camera 310 shall be positioned in accordance with its predetermined route for patrolling the area and filming shall be launched.

At stage 7020, video server 3210 shall receive video data from the camera followed by stage 7030 when it shall analyze the video data in order to detect signs of fire.

If there are no signs of fire ("No" branch at stage 7040), repeated routing may be launched (going back to stage 7010) or a video camera may be repositioned to a new route.

If any signs of fire are detected ("Yes" branch at stage 7040), at stage 7050 a video server 3210 shall create a potentially hazardous data object for possible fire detected, with reference to the video data which showed signs of fire and the metadata which described features of recording these video data.

Afterwards, at stage 7060, video server 3210 shall send the potentially hazardous data object created to object server 3310.

At stage 7070, object server 3310 shall receive a potentially hazardous data object, and at stage 7080 it shall compare the data object received with potentially hazardous data objects previously saved in terms of detecting among them such potentially hazardous data objects that correspond to the potentially hazardous data object received.

If such potentially hazardous data objects have not been detected ("No" branch at stage 7090), at stage 7100 object server 3310 shall save the data object received.

If such a potentially hazardous data object has been detected which corresponds to (for example, coincides with) the data object received ("Yes" branch at stage 7090), at stage 7110, object server 3310 shall adjust parameters of this data object detected based on parameters of the potentially hazardous data object received without saving this data object received.

At stage 7120, server 3310 shall send one or several potentially hazardous data objects to operator computer terminal 340.

At stage 7130 in the GUI of the client application an interactive list of potentially hazardous data objects received from object servers 3310 shall be visualized on computer terminal 340 for the operator.

At stage 7140 the operator shall access this potentially hazardous data object from the visualized list thereof, which leads to stage 7150 when the client application shall request multimedia data associated with this potentially hazardous data object and associated metadata from a corresponding video server 3210.

At stage 7160 the client application shall visualize the multimedia data and associated metadata received so that they could be analyzed by the operator.

At stage 7170, based on the results of inspection, using his/her client application the operator shall confirm or shall not confirm the possible fire caught which has been indicated by the potentially hazardous data object.

Figure 8:
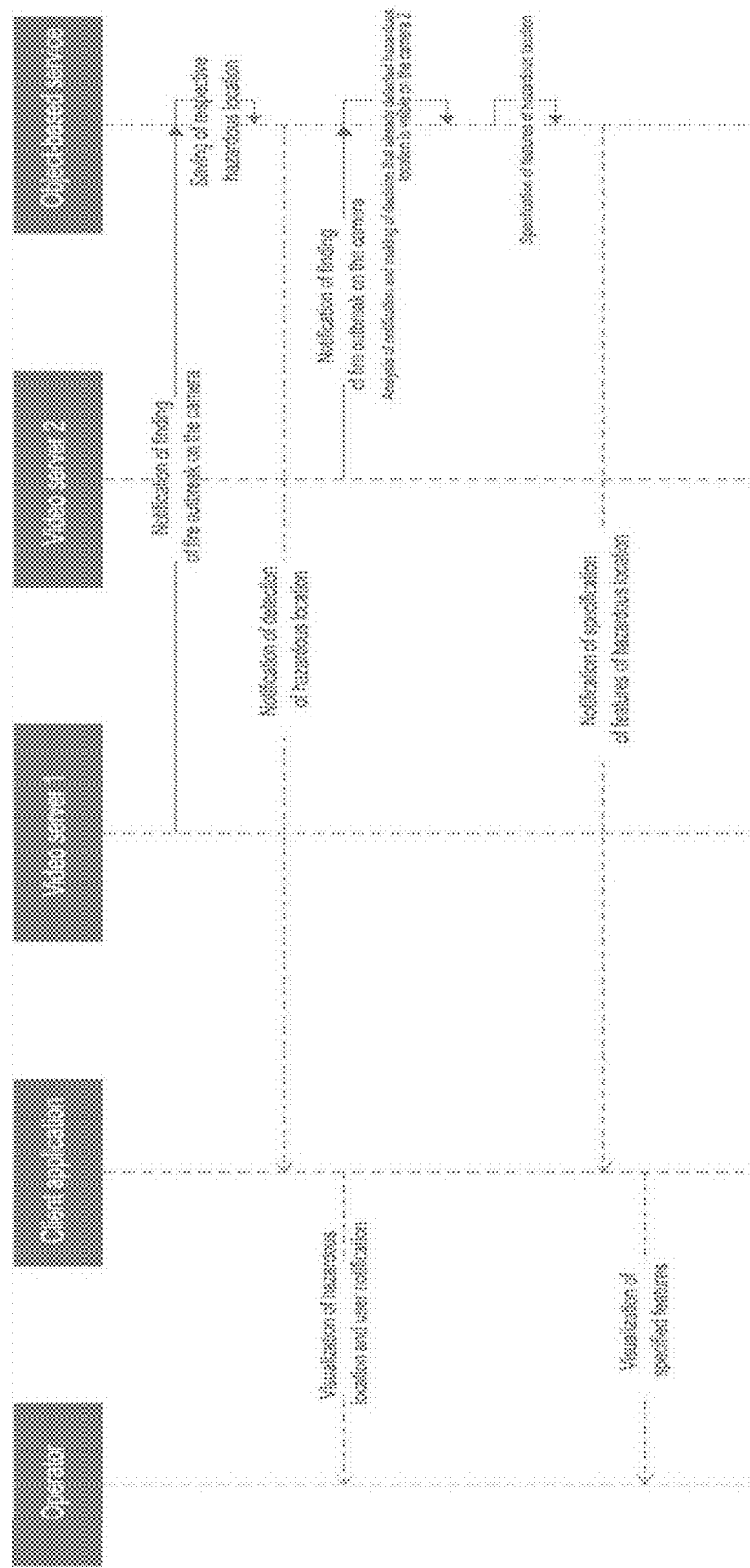
FIG. 8—illustration of message passing by way of example, according to FIG. 4.

FIG. 8 illustrates a dynamic aspect of an example showing how the system will function if the same PHO is detected with two video cameras controlled by different video servers, which has been discussed above with reference to FIG. 4.

A two-stage scheme proposed herein allows you to perform the most resource-intensive part of work (basically, analysis of footage by a computer vision system) on video servers whose computational power that is scaled by commissioning new video servers and balanced due to reallocation of responsibility for controlling cameras, which will be discussed in more detail below. At the second stage, decisions will be made by object servers based on results of processing carried out by video servers. This stage requires a lot fewer computational resources, which makes it possible to direct flows of notifications from multiple video servers to one object server, and make decisions based on information received from hundreds or even thousands of cameras.

Additional functional aspects of the forest video monitoring system proposed shall be described below.

Figure 10:
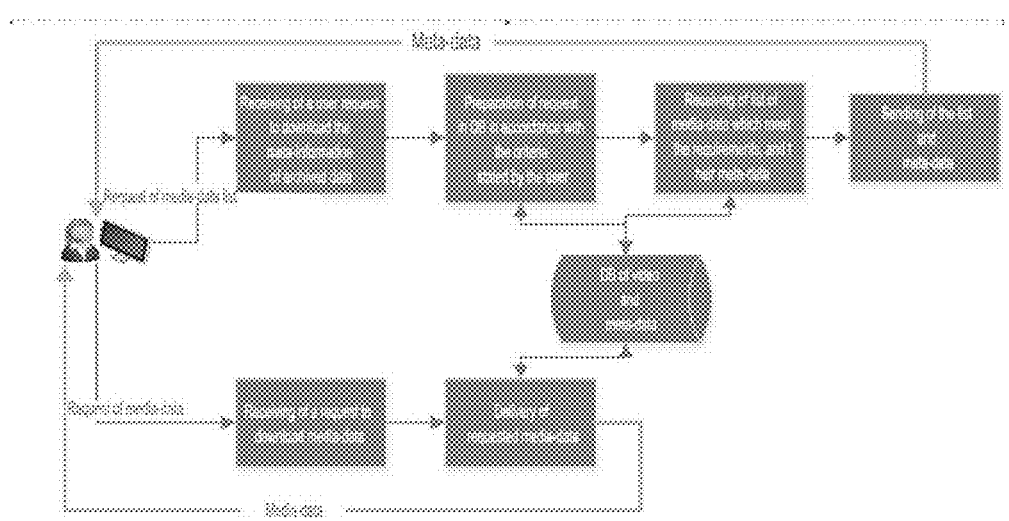

For instance, with reference to FIGS. 9 and 10 it shall be illustrated how to work directly with a video camera from a client application on operator computer.

As has been mentioned above, in addition to working with a list of potentially hazardous data objects, the client application shall enable the operator to work directly with video materials.

After initialization, the client application shall have information saying which video cameras available to the operator are maintained by particular video servers. All scenarios for user's work with multimedia data within the system are reduced to two camera operation modes:

gaining direct access to a video camera in real-time mode (FIG. 9);

obtaining archived video data taken from a camera (FIG. 10).

Both of these modes lead to connection established between the client application and the video server.

In terms of direct access to a video camera, the video server must be notified of operator's desire to gain such access, since the video server shall have to suspend its own work with this camera (stop repositioning the camera and getting the video flow) and set the camera to a mode which prevents other users from gaining such access. Thus, system operation compliant with the present invention (for example, in accordance with FIG. 7) shall be suspended.

At the same time, the camera shall also be controlled via the video server so that access to cameras could be unified and controlled (see FIG. 11). Indeed, direct access to a video camera must be allowed only to one user since it may otherwise cause a conflict in control as well as overload of the access channel to the camera due to the need to transmit two video flows. Besides, the server shall keep the camera in this mode for a limited time. If the user application does not confirm extension of direct access mode for the camera, the camera is considered to have been transferred to automatic operation.

In addition, multiple scenarios of working with the system described are held to imply that archived multimedia data collected from cameras by video servers will be shown to the user. At the same time, all of these scenarios lead to one of the two types of requests to the video sewer implemented:

obtaining descriptions of multimedia data compliant with criteria established by the client application (e.g. data taken from a particular camera or route, data related to particular objects, etc.);

obtaining multimedia data as they are (thumbnails, images, and videos).

Opposed to direct access, archived data may be simultaneously received by multiple users. The number of users is only limited by the bandwidth of the data transmission channel from the server.

Figure 12:
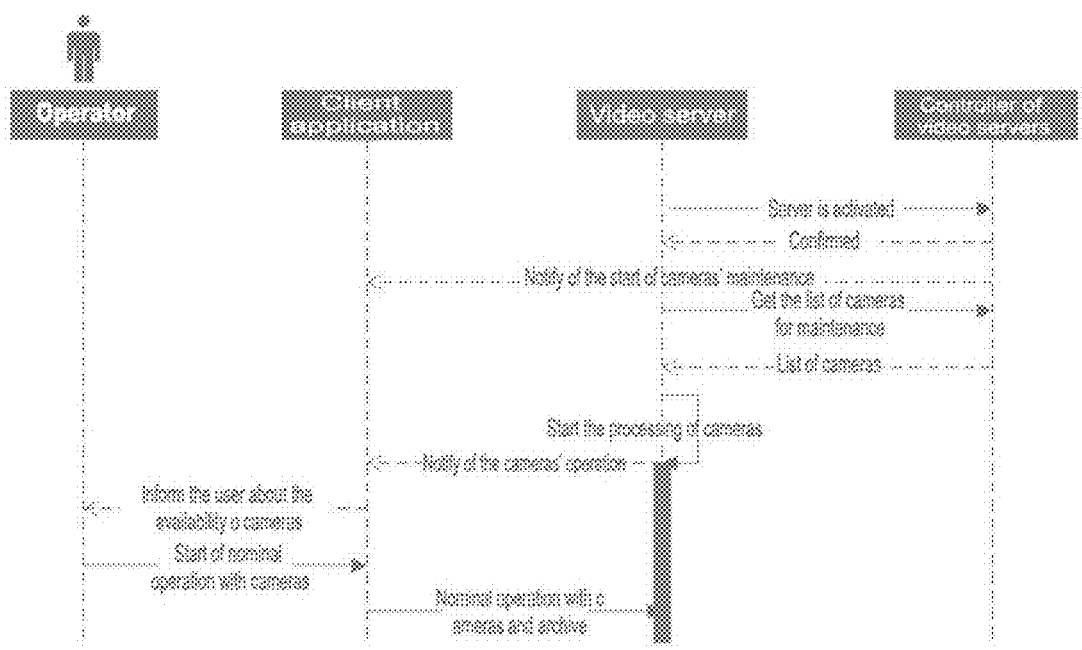
FIG. 12—illustration of a new video server being commissioned.

Further, with reference to FIG. 12, it is shown how a new video server is commissioned in order to illustrate scalability of the system.

As you can see in FIG. 12, the process consists of two stages—configuring the video server itself when it requests the controller to provide a list of video cameras for maintenance and initializing the video server when it determines availability of video cameras assigned to the video server for maintenance. Over the course of the first stage, client applications shall be informed about the fact that maintenance of cameras assigned to the video server has started. Over the course of the second stage, the video server shall inform client applications of the camera status and their readiness to carry out user requests for cameras which are maintained by it.

System administrators have a possibility either to bind maintenance of a particular camera strictly to the video server, or specify that the camera is maintained by any video server which has resources for that, in which case the video server controller independently decides which video server should maintain this camera.

This process is hidden for the system operator. The operator shall only learn that camera maintenance has started as they become available to him/her.

New cameras shall be commissioned in a similar way.

Figure 13:
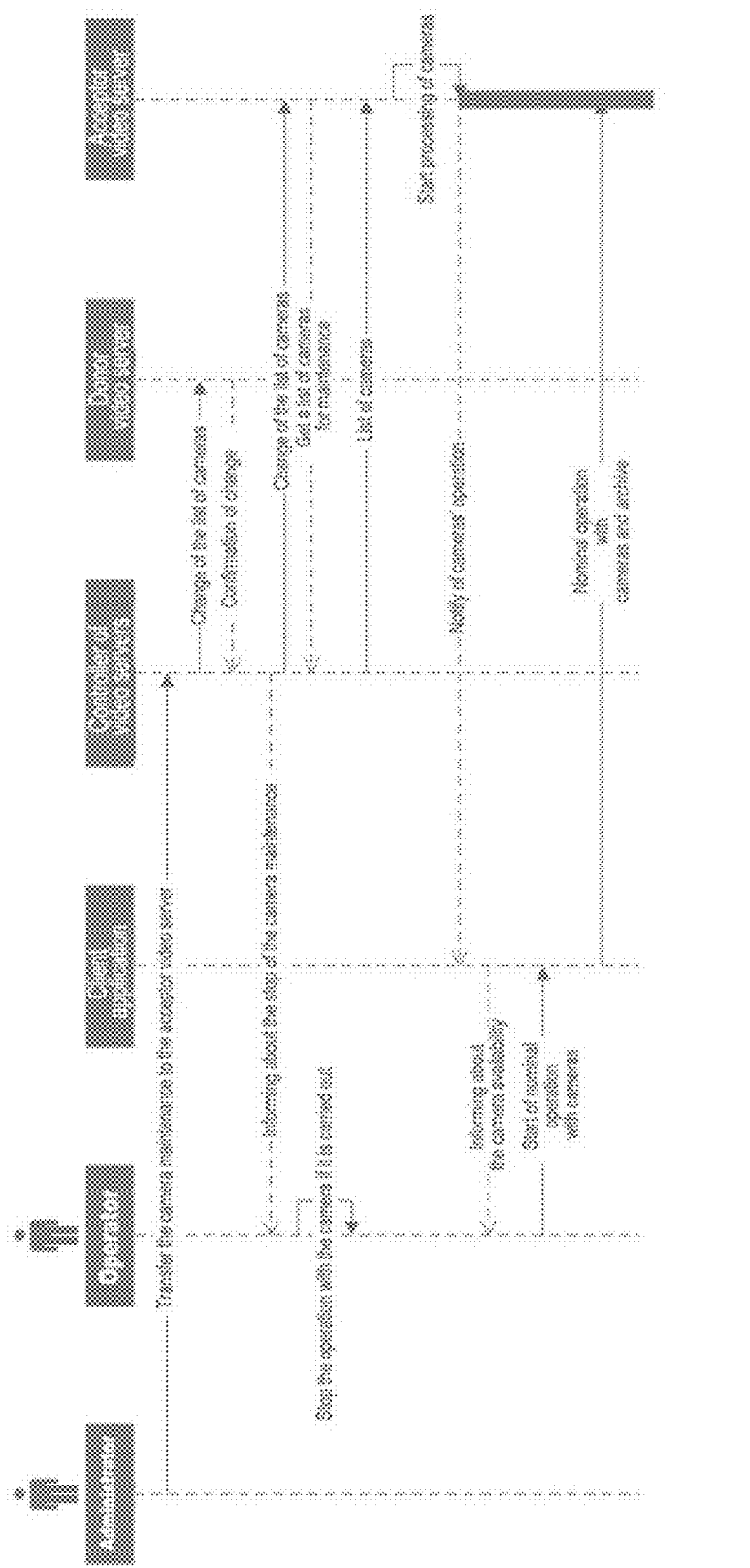
FIG. 13—illustration of camera maintenance being transferred from one video server to another one

Further, with reference to FIG. 13, it is shown how to transfer maintenance of cameras from one video server to another one for the sake of illustration of system robustness.

As stated above, such a transfer is required for balancing the load produced upon video servers when changing conditions of their operation (for example when reducing the bandwidth of the communication channel), or when decommissioning a server and reassigning maintained cameras to a different video server(s).

Maintenance transfer is accompanied by notifying a donating video server of the fact that its camera is going to be taken out of the area of its maintenance followed by immediate termination of maintenance by this donating video server and notifying the accepting video server of the fact that the list of video cameras maintained by it has also been changed (see FIG. 13). At the same time, for the operator such reconfiguration is accompanied by a short-term (a few dozens of seconds) downtime in camera operation.

The distributed architecture of the video monitoring system proposed has a certain degree of commonality of its components, which has a positive effect on reliability and cost of its operation. Indeed, due to a possibility of rapid reassignment of cameras between video servers maintaining them, it is possible to promptly introduce/remove video servers into and out of the system and reconfigure the system in order to reallocate computational workload. This fact directly affects the cost of operating a video server farm. Indeed, as video servers do not contain any data that are critical for the user and system operation and the system is able to quickly change the scheme of camera maintenance, requirements for video server reliability may be reduced, and reliability of the system as a whole at the same time reduced, whereas reliability of system operation as a whole shall not be reduced due to a possibility to quickly replace video servers that have gone out of order.

Although provided flexibility of the open video monitoring system is associated with a particular difficulty in its implementation (compared to classical systems), this complication does not affect experience of system operation by end-users (operators), since information about logical and physical configuration of the monitoring system is hidden from the user. While working, users apply such domain concepts as a camera, an area/territory, detected objects, while client applications in conjunction with maintenance of environment carry out correct routing of data required by the user in order to do their work.

Therefore, an open approach provides a solution to the following problems and relevant benefits gained:

placing system components with allowances made for heterogeneity of communication infrastructure of data transmission with overall load on communication channels reduced;

flexible management of computational resources required for data analysis;

carrying out such a multi-stage data analysis when mass data constantly generated by video cameras are filtered out and analyzed in the immediate logical proximity of video cameras, whereas further processing of data having a significantly smaller size compared to input data requires far fewer resources of communication infrastructure;

reducing costs of system operation without reducing its reliability.

The invention has been disclosed above with reference to specific variants of its implementation. Under the subject matter of a disclosure above, experts may see other evident options of embodiment of this invention different from the ones set forth herein. Accordingly, the invention should be considered limited in scope only by the following claims and their equivalents.

We claim:

1. A system for forest video monitoring, comprising:
   multiple video monitoring points, with each such point comprising a video camera installed on a tall structure;
   a subsystem for video monitoring management and primary processing of video data comprising one or several video servers, with each video server having one or several video monitoring points assigned to it from a mentioned set thereof intended for controlling video cameras within this one or several video monitoring points and with each server connected to video cameras of video monitoring points assigned to it via a communication channel for receiving video data recorded by these cameras;
   a subsystem for storage and secondary processing of video data comprising at least one object server;
   at least one computer terminal,
   with mentioned video servers, object servers, and computer terminals connected to a communication network,
   with each video server configured to perform the following functions:
      analyzing video data recorded in order to detect signs of fire,
      when detecting signs of fire, create a potentially hazardous data object related to fire possibly caught, and
      sending the potentially hazardous data object to the subsystem for storage and secondary processing of video data;
   with each object server being configured to:
      saving and modifying potentially hazardous data objects, and
      sending potentially hazardous data objects to computer terminals,
   with each computer at the terminal having a client application installed for ensuring that the operator interacts with the subsystem for video monitoring management and primary processing of video data and the subsystem for storage and secondary processing of video data, with the client application configured to receive potentially hazardous data objects from the subsystem for storage and secondary processing of data and submit such potentially hazardous data objects to the operator.

2. The system according to claim 1, wherein subsystem for video monitoring management and primary processing of video data comprises one or several databases, with each video server configured to save and store video data received, with reference to associated descriptive metadata, in a database related to it from this one or several databases.

3. The system according to claim 2, wherein each video server comprises a computer-implemented computer vision system for performing the mentioned analysis of video data, with video server's computer vision system retrieving video data to be analyzed from the database associated with this server and configured to create a potentially hazardous data object when detecting signs of fire in video data analyzed so that the potentially hazardous data object created would be attached to the video data which showed signs of fire and to associated metadata describing characteristics of the process of recording these video data.

4. The system according to claim 3, wherein each client application is configured to perform the following functions:
   visualizing a list of potentially hazardous data objects received from object servers to be seen by the operator;
   when any potentially hazardous data object from the list thereof is handled by the operator, requesting video data stored in the database and related to this potentially hazardous data object as well as associated metadata from a corresponding video server;
   visualizing the mentioned potentially hazardous data object for the operator by visualizing the video data and associated metadata received; and
   enabling the operator to confirm or not to confirm the possible fire which is indicated by the potentially hazardous data object visualized.

5. The system according to claim 1, wherein each object server is additionally configured to:
   compare a potentially hazardous data object received with potentially hazardous data objects previously saved in order to find potentially hazardous data objects that are interrelated with the potentially hazardous data object received, and
   perform, based on results of comparing, at least one of the following actions:
      save the potentially hazardous data object received, or
      modify at least one of the potentially hazardous data object previously saved, or
      modify the potentially hazardous data object received.

6. The system according to claim 1, wherein the subsystem for video monitoring management and primary processing of video data is supplemented with a video server controller connected to a communication network in order to manage operation of video servers, with the video server controller configured to dynamically reallocate load between video servers.

7. The system according to claim 6, wherein the video server controller comprises tools for diagnostics and analysis of current and average load produced upon video servers, with such load including computational load and network traffic load.

8. The system according to claim 7, wherein each object server, when detecting a potentially hazardous data object basically coinciding with the potentially hazardous data object received and stored among potentially hazardous data objects previously saved, is additionally configured to adjust features of the potentially hazardous data object detected on the basis of features of the potentially hazardous data object received, without saving the potentially hazardous data object received.

9. The system according to claim 7, wherein video servers receive lists of video monitoring points assigned to them for maintenance from the video server controller, with the video server controller configured to automatically perform dynamic reassignment of video monitoring points between video servers, depending on the load produced on video servers, with each video server configured to monitor its list of video monitoring points in terms of changes introduced by the video server controller.

10. The system according to claim 1, wherein is supplemented with at least one user environment server designed for controlling and configuring operators' access to components and resources of the forest video monitoring system via client applications as well as for routing data required by operators in order to do their job, jointly with client applications.

11. The system according to claim 10, wherein each client application is configured to dynamically determine, jointly with user environment servers, and visually show the operator information about components and resources of the forest video monitoring system available to him/her, with the client application configured to visually show the operator a list of object servers available to him/her, a list of video servers available him/her, and a list of available cameras maintained by these video servers, with the client application configured to enable the operator to access video data coming in real time from any video cameras available to him/her, or to saved video data previously recorded by any cameras available and manage operation of any video cameras available.

12. The system according to claim 1, wherein the client application is configured to assign video monitoring points to video servers.

13. The system according to claim 1, wherein the client application is configured to assign a territorial area of responsibility to each object server.

14. A method of fire detection implemented within the forest video monitoring system which comprises: multiple video cameras; multiple video servers, with each video server maintaining one or several multiple cameras; at least one object server; and a number of computer terminals, comprising the following steps:

by means of a video server out of a number of video servers
  receiving the video data from at least one video camera, analyzing the video data in order to detect signs of fire,
if signs of fire have been detected, a potentially hazardous data object related to possible fire detected shall be created, with reference to the video data where signs of fire have been detected, and
  sending the potentially hazardous data object to at least one object server; by means of an object server:
  receiving the potentially hazardous data object,
  comparing received potentially hazardous data object to previously saved potentially hazardous data object,
  based on results of comparison, executing at least one of the following steps:
    saving the received potentially hazardous data object,
    modifying previously received at least one potentially hazardous data object and sending at least one potentially hazardous data object to the at least one computer terminal; and
by means of the computer terminal:
  receiving the potentially hazardous data objects and submitting to the operator.

15. The method according to claim 14, wherein any potentially hazardous data object shall be created with reference to metadata describing characteristics of video data recording.

16. The method according to claim 14, wherein based on results of comparison mentioned, upon detection of a potentially hazardous data object basically coinciding with the potentially hazardous data object received and stored among potentially hazardous data objects previously saved, the potentially hazardous data object detected shall be modified on the basis of the potentially hazardous data object received, without saving the latter.

17. The method according to claim 14, wherein is supplemented with stages where a computer terminal is used to perform as follows:
  visualizing a list of potentially hazardous data objects received from object servers to be seen by the operator;
  when any potentially hazardous data object from the list thereof is handled by the operator, requesting video data related to this potentially hazardous data object as well as associated metadata from a corresponding video server;
  visualizing the mentioned potentially hazardous data object for the operator by visualizing the video data and associated metadata received; and
  enabling the operator to confirm or not to confirm the possible fire which is indicated by the potentially hazardous data object visualized.

* * * * *